(12) United States Patent
Hu (10) Patent No.: US 9,329,043 B2
(45) Date of Patent: *May 3, 2016

(54) NAVIGATION SYSTEM HAVING MILEAGE MECHANISM AND METHOD OF OPERATION THEREOF

(71) Applicant: FleetCor Technologies Operating Company, LLC, Norcross, GA (US)

(72) Inventor: Jinsong Hu, San Jose, CA (US)

(73) Assignee: FleetCor Technologies Operating Company, LLC, Norcross, GA (US)

( * ) Notice: Subject to any disclaimer, the term of this patent is extended or adjusted under 35 U.S.C. 154(b) by 211 days.

This patent is subject to a terminal disclaimer.

(21) Appl. No.: 14/096,601

(22) Filed: Dec. 4, 2013

(65) Prior Publication Data

US 2014/0095070 A1    Apr. 3, 2014

Related U.S. Application Data

(63) Continuation of application No. 12/334,350, filed on Dec. 12, 2008, now Pat. No. 8,606,458.

(51) Int. Cl.
*G01C 21/00* (2006.01)
*G01C 22/00* (2006.01)

(52) U.S. Cl.
CPC ............... *G01C 21/00* (2013.01); *G01C 22/00* (2013.01)

(58) Field of Classification Search
CPC .................................................... G01C 21/26
See application file for complete search history.

(56) References Cited

U.S. PATENT DOCUMENTS

| 3,984,806 | A | * | 10/1976 | Tyler ............................ 340/992 |
| 5,941,934 | A | | 8/1999 | Sato |
| 5,954,773 | A | | 9/1999 | Luper |
| 5,974,356 | A | * | 10/1999 | Doyle et al. .................. 701/420 |
| 6,087,965 | A | | 7/2000 | Murphy |
| 6,088,650 | A | * | 7/2000 | Schipper et al. .............. 701/521 |
| 6,393,346 | B1 | * | 5/2002 | Keith et al. ................... 701/521 |
| 6,862,522 | B2 | * | 3/2005 | Brynielsson .................. 701/527 |
| 7,135,961 | B1 | | 11/2006 | Operowsky et al. |
| 7,366,606 | B2 | | 4/2008 | Uyeki |
| 7,522,069 | B2 | * | 4/2009 | Tunnell et al. ........... 340/995.19 |
| 2002/0133271 | A1 | * | 9/2002 | McDermott et al. ............ 701/1 |
| 2003/0187572 | A1 | * | 10/2003 | Tengler .................. G01C 21/26 701/527 |
| 2004/0006411 | A1 | | 1/2004 | Kane |
| 2004/0049335 | A1 | | 3/2004 | Schmidt et al. |
| 2004/0054453 | A1 | | 3/2004 | Brynielsson |
| 2004/0160358 | A1 | * | 8/2004 | Jonsson et al. ........... 342/357.08 |
| 2006/0287815 | A1 | | 12/2006 | Gluck |
| 2008/0091348 | A1 | * | 4/2008 | Choi .................. G01C 21/3415 701/414 |
| 2008/0183376 | A1 | | 7/2008 | Knockeart et al. |
| 2009/0030600 | A1 | * | 1/2009 | Liu .............................. 701/201 |
| 2009/0292418 | A1 | * | 11/2009 | Kuykendal ...................... 701/35 |
| 2010/0063904 | A1 | * | 3/2010 | Ronen .................... G01C 21/26 705/30 |

OTHER PUBLICATIONS

Extended European Search Report for European Patent Application No. 09832469.2, issued Oct. 11, 2014.

* cited by examiner

*Primary Examiner* — Jonathan K Ng
(74) *Attorney, Agent, or Firm* — King & Spalding (57) ABSTRACT

A method of operation of a navigation system having mileage mechanism includes providing a subtotal mileage for a previous location reading along a route; calculating an incremental mileage at a current location reading from the previous location reading; and calculating a total mileage based on the subtotal mileage and the incremental mileage for displaying on a device.

7 Claims, 6 Drawing Sheets

FIG. 8

NAVIGATION SYSTEM HAVING MILEAGE MECHANISM AND METHOD OF OPERATION THEREOF

RELATED APPLICATION

This patent application is a continuation of U.S. patent application Ser. No. 12/334,350, filed Dec. 12, 2008. The complete disclosure of the above-identified application is hereby fully incorporated herein by reference.

TECHNICAL FIELD

The present invention relates generally to a navigation system, and more particularly to a navigation system having a mileage measurement mechanism.

BACKGROUND

Modern portable consumer and industrial electronics provide increasing levels of functionality to support modern life including location-based information services. This is especially true for client devices such as navigation systems, cellular phones, portable digital assistants, and multifunction devices. Numerous technologies have been developed to utilize this new functionality. Some of the research and development strategies focus on new technologies. Others focus on improving the existing and mature technologies. Research and development in the existing technologies can take a many of different directions.

As users become more empowered with the growth of mobile location based service devices, new and old usage begin to take advantage of this new device space. There are many technological solutions to take advantage of this new device location opportunity. One existing approach is to use location information to provide navigation services such as a global positioning service (GPS) navigation system for a mobile device. However, location reading systems can have inaccuracies that can impair a navigation system.

Thus, a need remains for a navigation system to efficiently measure distances between location readings and to provide more accurate routing guidance. In view of the ever-increasing added features desired by consumers in their mobile devices, it is more and more critical that answers be found to these problems.

Solutions to these problems have been long sought but prior developments have not taught or suggested any solutions and, thus, solutions to these problems have long eluded those skilled in the art.

SUMMARY OF THE INVENTION

One aspect of the present invention provides a method of operation of a navigation system having mileage mechanism including: providing a subtotal mileage for a previous location reading along a route; calculating an incremental mileage at a current location reading from the previous location reading; and calculating a total mileage based on the subtotal mileage and the incremental mileage for displaying on a device.

Another aspect of the present invention provides a navigation system having mileage mechanism including: a storage unit for providing a subtotal mileage for a previous location reading along a route; an incremental calculation module, coupled to the storage unit, for calculating an incremental mileage at a current location reading from the previous location reading; and a total mileage module, coupled to the incremental calculation module, for calculating a total mileage based on the subtotal mileage and the incremental mileage for displaying on a device.

Certain embodiments of the invention have other aspects in addition to or in place of those mentioned above. The aspects can become apparent to those skilled in the art from a reading of the following detailed description when taken with reference to the accompanying drawings.

DETAILED DESCRIPTION OF EXEMPLARY EMBODIMENTS

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail. Likewise, the drawings showing embodiments of the system are semi-diagrammatic and not to scale and, particularly, some of the dimensions are for the clarity of presentation and are shown greatly exaggerated in the drawing FIGs.

One skilled in the art would appreciate that the format with which navigation information is expressed is not critical to some embodiments of the invention. For example, in some embodiments, navigation information is presented in the format of (x, y), where x and y are two ordinates that define the geographic location, i.e. a position of a user. The navigation information is presented by longitude and latitude related information. The navigation information also includes a direction component.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be a machine code, an assembly code, an application level, or a combination thereof The hardware can be circuitry, a subsystem board, a system, a distributed system, or a combination thereof For example, circuitry can include analog circuits, digital circuits, a processor, or an application specific integrated circuit.

Figure 1:
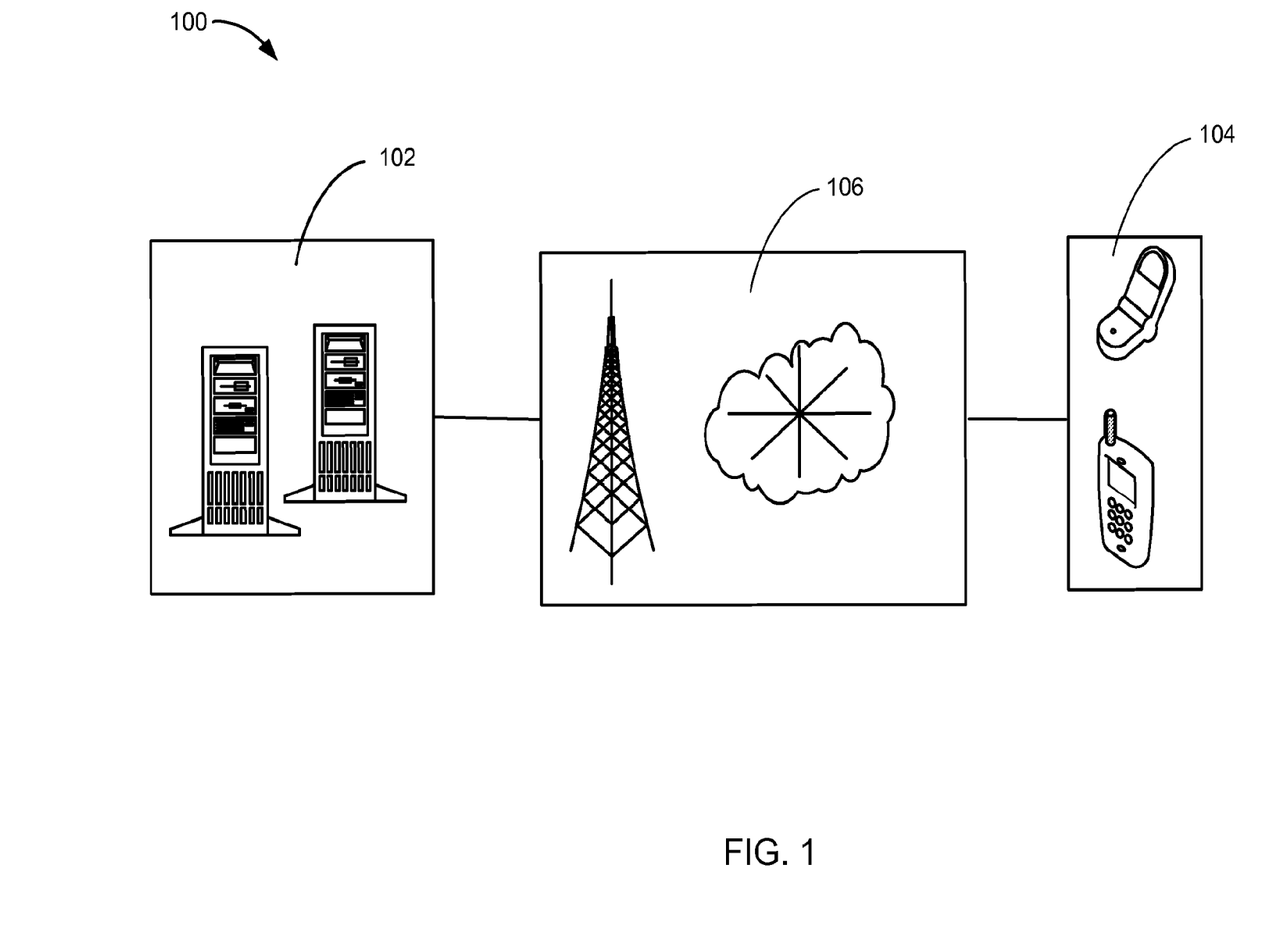
FIG. 1 is an example of an environment using an embodiment of the present invention.

Referring now to FIG. 1, therein is an example of an environment 100 using an embodiment of the present invention. The environment 100 applies to any embodiment of the present invention described later. The environment includes a first device 102, such as a server or client. The first device 102 can be linked to a second device 104, such as a client or server, with a communication path 106, such as a network.

The first device 102 can be any of a variety of centralized or decentralized computing devices. For example, the first device 102 can be a computer, a computer in a grid computing pool, a virtualized computer, a computer in a cloud computing pool, or a computer in a distributed computing topology. The first device 104 can include routing functions or switching functions for coupling with the communication path 106 to communicate with the second device 104.

The second device 104 can be of any of a variety of mobile devices. For example, the second device 104 can be a cellular phone, personal digital assistant, a notebook computer, or other multi-functional mobile communication or entertainment devices having means for coupling to the communication path 106.

The communication path 106 can be a variety of networks. For example, the communication path 106 can include wireless communication, wired communication, optical, ultrasonic, or the combination thereof Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include personal area network (PAN), local area network (LAN), metropolitan area network (MAN), and wide area network (WAN).

For illustrative purposes, the first device 102 is shown in a single location, although it is understood that the server can be centralized or decentralized and located at different locations. For example, the first device 102 can represent real or virtual servers in a single computer room, distributed across different rooms, distributed across different geographical locations, embedded within a telecommunications network, virtualized servers within one or more other computer systems including grid or cloud type computing resources, or in a high powered client device.

Further for illustrative purposes, the environment 100 is shown with the second device 104 as a mobile computing device, although it is understood that the second device 104 can be different types of computing devices. For example, the second device 104 can be a mobile computing device, such as notebook computer, another client device, or a different type of client device.

Yet further for illustrative purposes, the environment 100 is shown with the first device 102 and the second device 104 as end points of the communication path 106, although it is understood that the environment 100 can have a different partition between the first device 102, the second device 104, and the communication path 106. For example, the first device 102, the second device 104, or a combination thereof can also function as part of the communication path 106.

Figure 2:
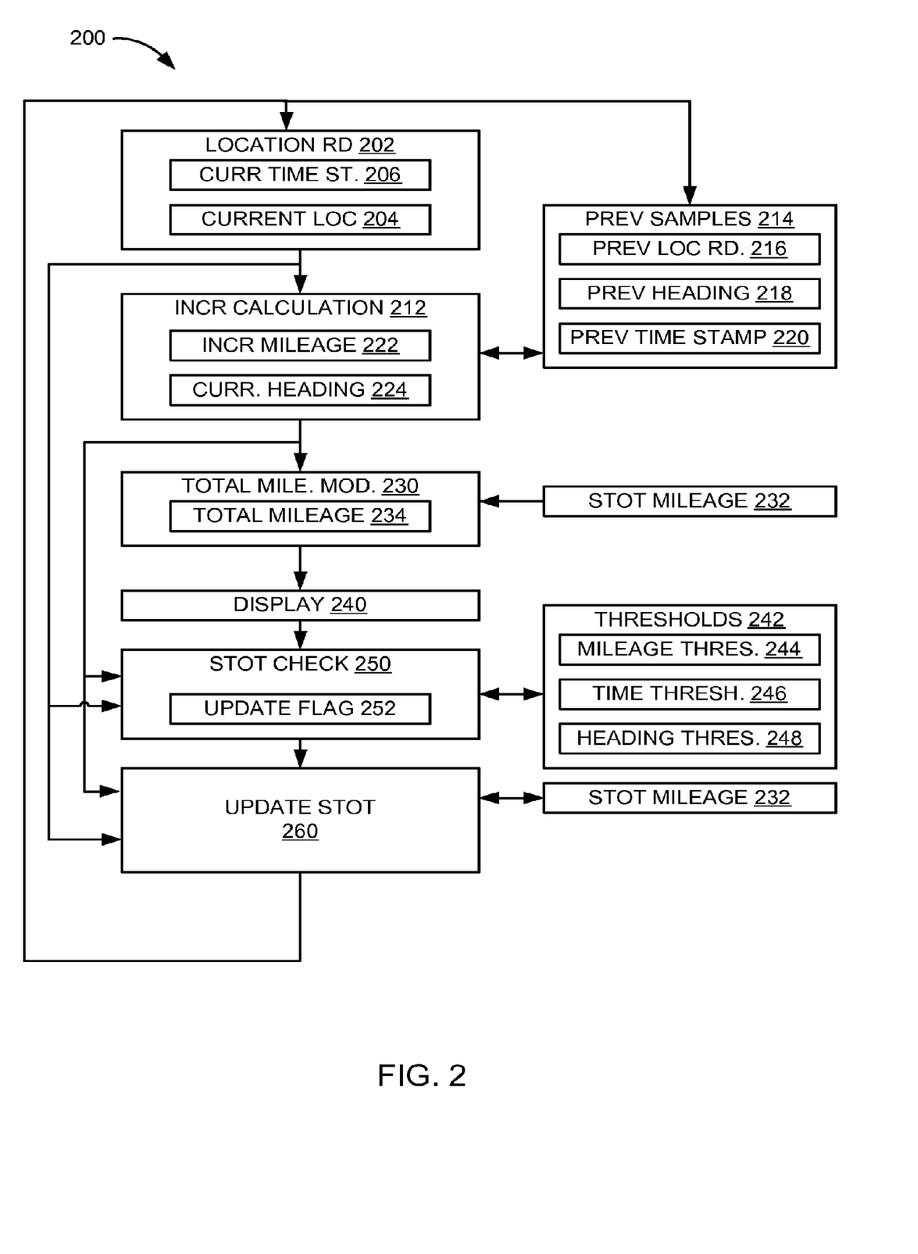
FIG. 2 is a flow chart of a navigation system having mileage mechanism in a first embodiment of the present invention.

Referring now to FIG. 2, therein is shown a flow chart of a navigation system 200 having mileage mechanism in a first embodiment of the present invention. The navigation system 200 can calculate the total mileage traversed by the navigation system 200 as the sum of a subtotal mileage 232, such as a bulk mileage, and an incremental mileage 222. The navigation system 200 can determine the subtotal mileage 232 and calculate the incremental mileage 222.

The subtotal mileage 232 is defined as a mileage traversed along a route to a predetermined location. For example, the subtotal mileage 232 of a mileage calculation of the navigation system 200 represents a mileage that remains fixed to the predetermined location until the navigation system 200 updates it.

The subtotal mileage 232 can be measured from a start of a route to the predetermined location. The subtotal mileage 232 can be stored in a memory or other storage, and retrieved from or provided by storage as required for mileage calculation. The predetermined location can be a previous location reading 216, which can be stored in a previous samples module 214.

The previous samples module 214 can also store a previous heading 218 and a previous time stamp 220. The previous heading 218 can be a heading of the navigation system 200 associated with the previous location reading 216 and the previous time stamp 220. For example, the previous heading 218 can describe the heading of the navigation system 200 calculated at the previous location reading 216 at the previous time stamp 220.

The incremental mileage 222 is defined as a mileage traversed from the last location determining the subtotal mileage 232. For the purpose of any embodiment of the present invention, an incremental is described as an offset distance up to a current location measured in real-time by the navigation system 200. As another example, the incremental mileage 222 can be a further location beyond the pre-determined location for the subtotal mileage 232 and not necessarily operated in real-time.

The incremental portion of a mileage calculation represents a mileage that is calculated each time a current location is received by the system. For example, the incremental mileage 222 can be a distance from the previous location reading 216 to a current location reading 204 representing the current location.

A location reading module 202 of the navigation system 200 can generate or receive the current location reading 204, which can represent an actual current location of the navigation system 200. The location reading module 202 can also generate or receive a current time stamp 206 associated with the current location reading 204.

An incremental calculation module 212 can receive the previous location reading 216 and the previous heading 218 both from the previous samples module 214. The incremental calculation module 212 can also receive the current location reading 204 from the location reading module 202. The incremental calculation module 212 can calculate the incremental mileage 222 which is the distance from the previous location reading 216 to the current location reading 204.

The incremental calculation module 212 can also generate a current heading 224 associated with the current location reading 204. The current heading 224 can be a heading from the previous location reading 216 to the current location reading 204. The incremental calculation module 212 can determine a change in heading by comparing the current heading 224 with the previous heading 218 from the previous samples module 214.

A total mileage module 230 can calculate a total mileage 234 traversed by the navigation system 200. For example, the total mileage module 230 can receive the incremental mileage 222 from the incremental calculation module 212, and the subtotal mileage 232 from storage. The subtotal mileage 232 can be initialized to a predetermined value, such as zero or another mileage value, at the start of a route. As will be described in more detail, the subtotal mileage 232 can also be updated by the navigation system 200 in an update subtotal module 260.

The total mileage module 230 can add the incremental mileage 222 and the subtotal mileage 232 to calculate the total mileage 234. The total mileage 234 can represent the distance traveled by the navigation system 200 from the start of a journey or a predetermined location measured by the subtotal mileage 232.

A display module 240 of the navigation system 200 can receive the total mileage 234 from the total mileage module 230. The display module 240 can display the total mileage 234 on the navigation system 200.

A subtotal check module 250 can decide whether to update the subtotal mileage 232 based on pre-defined thresholds 242 and from a previous update of the subtotal mileage 232. The pre-defined thresholds 242 can be a mileage threshold 244, a time threshold 246, a heading threshold 248, or a combination thereof. The subtotal check module 250 can receive the current location reading 204 from the location reading module 202 and the current heading 224 from the incremental calculation module 212.

The mileage threshold 244 can be defined as a limit on the mileage measurement of the incremental mileage 222 from the location of the subtotal mileage 232. For example, the mileage threshold 244 can be set to a narrow range, such as under a city block in a crowded metropolitan area. As another example, the mileage threshold 244 can be set to a broad range, such as in granularity of miles for a sparse area along a highway between metropolitan areas. If the incremental mileage 222 to the current location reading 204 meets or exceeds the mileage threshold 244, the navigation system 200 can update the subtotal mileage 232.

The time threshold 246 is defined as a time limit from the previous update of the subtotal mileage 232. For example, the time threshold 246 can be set to a narrow range, less than a minute in a crowded metropolitan area. As another example, the time threshold 246 can be set to a broad range, such as in a granularity of multiple minutes in a sparse area along a highway between metropolitan areas. If the time from the previous subtotal update meets or exceeds the time threshold 246, the navigation system 200 can update the subtotal mileage 232.

The heading threshold 248 is defined as a limit to a change of heading from the previous update of the subtotal mileage 232. For example, the navigation system 200 can detect the change in heading with a turn by the navigation system 200 from the previous location reading 216 or the current heading 224.

For example, the heading threshold 248 can be set to a narrow range, such as in a granularity of single digit degree, for sparse open space areas. As another example, the heading threshold 248 can be set to a broader range, such as in a granularity of double digit degrees, for crowded metropolitan areas. If the current heading 224 is outside the heading threshold 248, the navigation system 200 can update the subtotal mileage 232.

If the subtotal check module 250 determines that any of the time threshold 246, the mileage threshold 244, or the heading threshold 248 has been met or exceeded, then the subtotal check module 250 can set an update flag 252, which can trigger the update subtotal module 260 to operate. If none of the thresholds has been met or exceeded, the subtotal check module 250 does not set the update flag 252, and the navigation system 200 can return to the location reading module 202.

If the subtotal check module 250 sets the update flag 252, the update subtotal module 260 can receive the update flag 252 from the subtotal check module 250. The update subtotal module 260 can also receive the total mileage 234 and can update the subtotal mileage 232.

The update subtotal module 260 can also update the previous samples module 214. The update subtotal module 260 can receive the current location reading 204 and the current time stamp 206 from the location reading module 202. The update subtotal module 260 can also receive the current heading 224 from the incremental calculation module 212.

The update subtotal module 260 can update the previous location reading 216 with the current location reading 204. The update subtotal module 260 can also update the previous heading 218 with the current heading 224. The update subtotal module 260 can also update the previous time stamp 220 with the current time stamp 206 as. From the update subtotal module 260, the navigation system 200 can return to the location reading module 202.

Figure 3:
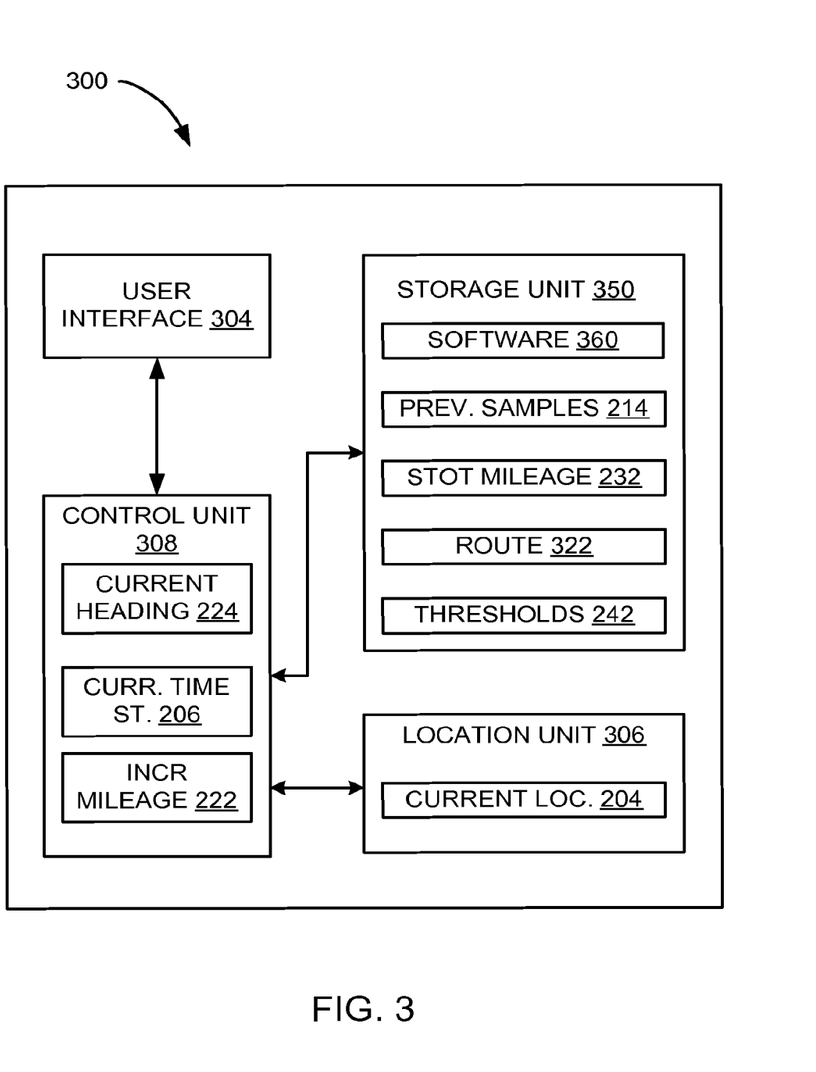
FIG. 3 is a block diagram of a navigation system having mileage mechanism in a second embodiment of the present invention.

Referring now to FIG. 3, therein is shown a block diagram of a navigation system 300 having mileage mechanism in a second embodiment of the present invention. The navigation system 300 can be the first device 102 of FIG. 1.

The navigation system 300 can include a user interface 304, a location unit 306, a storage unit 350 and a control unit 308, such as a processor. For example, the navigation system 300 can be any of a variety of devices, such as a cellular phone, a personal digital assistant, a notebook computer, or an entertainment device. The navigation system 300 can be a standalone device, or can be incorporated with a vehicle, for example a car, truck, bus, or train.

The user interface 304 can include an input device and an output device. For example, the output device can include a display, a projector, a video screen, a speaker, or any combination thereof Examples of the input device include a key pad, a touchpad, soft-keys, a keyboard, a microphone, or any combination thereof to provide data and communication inputs.

The control unit 308 can execute a software 360 and can provide the intelligence of the navigation system 300. As an example, the software 360 can include the navigation system 200 of FIG. 2. The control unit 308 can operate the user interface 304 to display information generated by the navigation system 200 of FIG. 2. The control unit 308 can also execute the software 360 for the other functions of the navigation system 200, including receiving location information from the location unit 306.

The control unit 308 can also generate the current time stamp 206, and operate the incremental calculation module 212 of FIG. 2 to calculate the incremental mileage 222 and the current heading 224 of the navigation system 300. The control unit 308 can also operate the total mileage module 230 of FIG. 2 to calculate the total mileage 234 of FIG. 2 traveled by the navigation system 300. The control unit 308 can also operate the subtotal check module 250 of FIG. 2 and the update subtotal module 260 of FIG. 2.

The location reading module 202 of FIG. 2 can operate the location unit 306 of the navigation system 300 to generate the current location reading 204 of the navigation system 300.

The location unit 306 can be implemented in many ways. For example, the location unit 306 can be a global positioning system (GPS), inertial navigation system, cell-tower location system, accelerometer location system, or any combination thereof The storage unit 350 can store the software 360, setup data, and other data for the operation of the navigation system 300. The storage unit 350 can also store the relevant information, such as maps, advertisements, points of interest (POI), navigation routing entries, or any combination thereof For example, the storage unit 350 can include navigation routing information, such as a route 322 from a starting location to a target destination.

The storage unit 350 can also include the previous samples module 214, which can include a history of the previous locations, sampled by the location unit 306, of the navigation system 300. For example, the previous samples module 214 can include the previous location reading 216 of FIG. 2, the previous heading 218 of FIG. 2, the previous time stamp 220 of FIG. 2, and earlier location readings, time stamps and headings, etc. The storage unit 350 can also include the subtotal mileage 232, and the pre-defined thresholds 242. The control unit 308 can operate on the data of the storage unit 350 to execute the functions of the navigation system 200.

Figure 4:
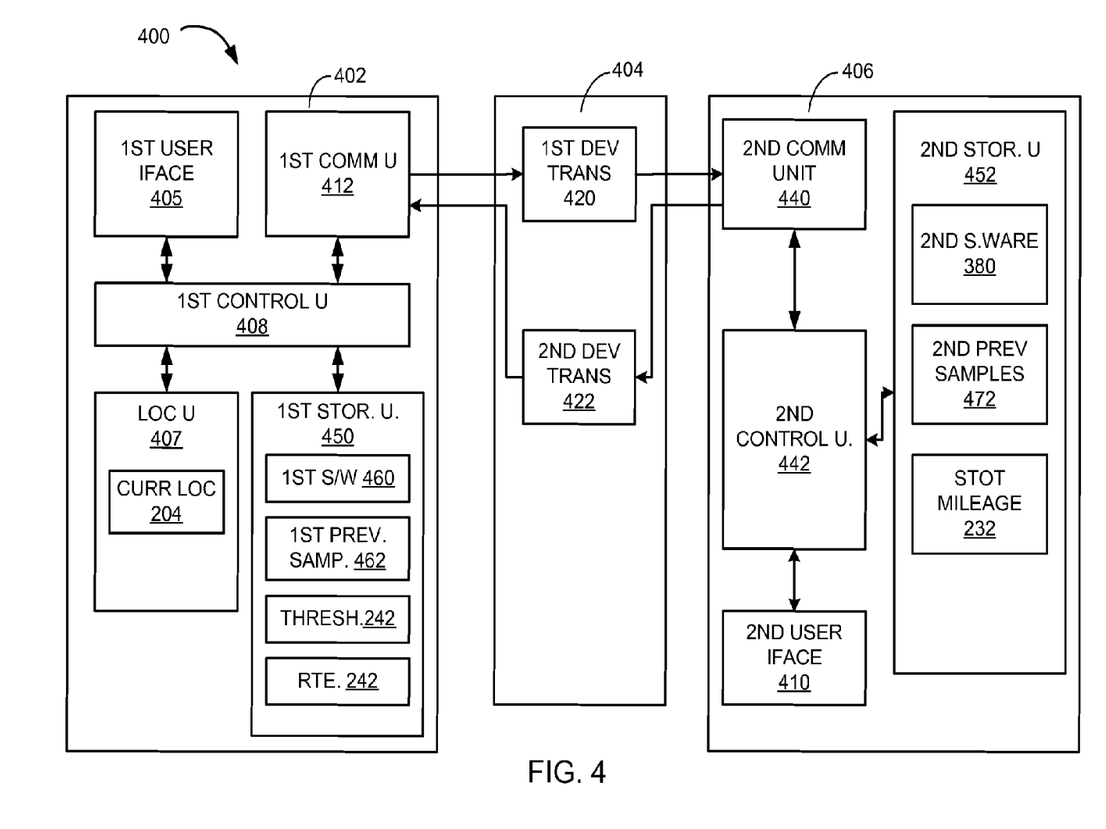
FIG. 4 is a block diagram of a navigation system having mileage mechanism in a third embodiment of the present invention.

Referring now to FIG. 4, therein is shown a block diagram of a navigation system 400 having mileage mechanism in a third embodiment of the present invention. The navigation system 400 can include a first device 402, a communication path 404, and a second device 406. The first device 402 can communicate with the second device 406 over the communication path 404.

The first device 402 can send information in a first device transmission 420 over the communication path 404 to the second device 406. The second device 406 can send a second device transmission 422 over the communication path 404 to the first device 402.

For illustrative purposes, the navigation system 400 is shown with the first device 402 as a client, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client.

For brevity of description this embodiment of the present invention, the first device 402 will be described as a client device and the second device 406 will be described as a server device. The present invention is not limited to this selection for the type of devices. The selection is an example of the present invention.

The first device 402 can include, for example, a first control unit 408, such as a processor, a first storage unit 450, a first communication unit 412, a location unit 407, and a first user interface 405. For illustrative purposes, the navigation system 400 is shown with the first device 402 described with discrete functional modules, although it is understood that the navigation system 400 can have the first device 402 in a different configuration. For example, the first control unit 408, the first communication unit 412, the first user interface 405 may not be discrete functional modules, but may have one or more of the aforementioned modules combined into one functional module.

The first control unit 408 can execute a first software 460 from the first storage unit 450 and provide the intelligence of the first device 402. As an example, the first software 460 can include a portion of the navigation system 200 of FIG. 2. The first control unit 408 can operate the first user interface 405 to display information generated by the navigation system 200. The first control unit 408 can also execute the first software 460 for the other functions of the navigation system 400.

The first control unit 408 can operate the location reading module 202 of FIG. 2 to receive location information from the location unit 407. The first control unit 408 can receive the current location reading 204 of FIG. 2, and generate the current time stamp 206 of FIG. 2. The first control unit 408 can also execute the incremental calculation module 212 of FIG. 2 to obtain the current heading 224 of FIG. 2 and to calculate the incremental mileage 222.

The first storage unit 450 can be implemented in a number of ways. For example, the first storage unit 450 can be a volatile memory, a nonvolatile memory, an internal memory, or an external memory.

The first storage unit 450 can include the first software 460, a first previous samples module 462, and the pre-defined thresholds 242 of FIG. 2. The first previous samples module 462 can be a portion of the previous samples module 214. The first previous samples module 462 can include a history of the previous locations, sampled by the location unit 407.

For example, the first previous samples module 462 can include the previous location reading 216 of FIG. 2, the previous heading 218 of FIG. 2, the previous time stamp 220 of FIG. 2, and earlier location readings and headings, etc. The first previous samples module 462 can be used by the navigation system 400 to calculate the incremental mileage 222 from the previous location reading 216 of FIG. 2 to the current location reading 204.

The first user interface 405 can include an output device and an input device. For example, the output device can include a projector, a video screen, a speaker, or any combination thereof. Examples of the input device include a key pad, a touchpad, soft-keys, a keyboard, a microphone, or any combination thereof to provide data and command inputs.

The location unit 407 of the first device 402 can generate a current location of the first device 402 as the current location reading 204. The location unit 407 can be implemented in many ways. For example, the location unit 407 can be a global positioning system (GPS), inertial navigation system, cell-tower location system, accelerometer location system, or any combination thereof.

The first communication unit 412 can include active and passive components, such as microelectronics or an antenna, for interaction with the communication path 404. The first control unit 408 can execute the first software 460 and can provide the intelligence of the first device 402 for interaction with the second device 406, the first user interface 405, the communication path 404 via the first communication unit 412, and interaction to the location unit 407.

The second device 406 can include, for example, a second control unit 442, such as a processor or computer, a second storage unit 452, a second communication unit 440, and a second user interface 410. For illustrative purposes, the navigation system 400 is shown with the second device 406 described with discrete functional modules, although it is understood that the navigation system 400 can have the second device 406 in a different configuration. For example, the second control unit 442, the second communication unit 440, and the second user interface 410 may not be discrete functional modules, but may have one or more of the aforementioned modules combined into one functional module.

The second storage unit 452 can include a second software 470 of the second device 406, a second previous samples module 472, and the subtotal mileage 232. The second previous samples module 472 can be a portion of the previous samples module 214. As an example, the second software 470 can include a portion of the navigation system 200. For illustrative purposes, the second storage unit 452 is shown as a single element, although it is understood that the second storage unit 452 can be a distribution of storage elements.

Also for illustrative purposes, the navigation system 400 is shown with the second storage unit 452 as a single hierarchy storage system, although it is understood that the navigation system 400 can have the second storage unit 452 in a different configuration. For example, the second storage unit 452 can be formed with different storage technologies forming a memory hierarchal system including different levels of caching, main memory, rotating media, or off-line storage.

The second previous samples module 472 can include a history of the previous locations sampled by the location unit 407. For example, the second previous samples module 472 can include the previous location reading 216 of FIG. 2, the previous heading 218 of FIG. 2, the previous time stamp 220 of FIG. 2, and earlier location readings, time stamps and headings, etc.

The first previous samples module 462 can cooperate with the second previous samples module 472. For example, the second previous samples module 472 can contain older location readings of the first device 402 and other devices, while the first previous samples module 462 can contain more recent location readings of the first device 402. The second storage unit 452 can also include the subtotal mileage 232.

The second control unit 442 can execute the second software 470 and provide the intelligence of the second device 406 for interaction with the first device 402, the second user interface 410 and the communication path 404 via the second communication unit 440. As an example, the second software 470 can include the navigation system 200 of FIG. 2.

The first communication unit 412 can couple with the communication path 404 to send information to the second device 406 in the first device transmission 420. The second device 406 can receive the first device transmission 420 from the communication path 404 in the second communication unit 440.

The second communication unit 440 can couple with the communication path 404 to send information to the first device 402 in the second device transmission 422. The first device 402 can receive the second device transmission 422 from the communication path 404 in the first communication unit 412.

The navigation system 200 can be executed by the first control unit 408, the second control unit 442, or a combination thereof. The first control unit 408 can operate the location reading module 202 to obtain the current location reading 204 and the current time stamp 206. The location reading module 202 can operate the location unit 407 to generate the current location reading 204.

The first control unit 408 can generate the current time stamp 206. The first control unit 408 can also obtain the previous location reading 216, the previous heading 218 and the previous time stamp 220 from the first previous samples module 462. The first control unit 408 can also operate the incremental calculation module 212 of FIG. 2 to calculate the incremental mileage 222 of FIG. 2 and the current heading 224 of FIG. 2 of the navigation system 400. The first communication unit 412 can send a request over the communication path 404 in the first device transmission 420 to the second device 406 for the subtotal mileage 232.

The second communication unit 440 can receive the request, and the second control unit 442 can retrieve the subtotal mileage 232 from the second storage unit 452. The second communication unit 440 can send the subtotal mileage 232 across the communication path 404 to the first device 402 in the second device transmission 422. The first communication unit 412 can receive the subtotal mileage 232 from the communication path 404.

The first control unit 408 can operate the total mileage module 230 of FIG. 2 to calculate the total mileage 234 of FIG. 2 which is the distance traveled by the first device 402 from a starting location to the current location reading 204. The first device 402 can also operate the display module 240 of FIG. 2 to display the total mileage 234 or other navigation routing information on the first user interface 405. The first control unit 408 can also operate the subtotal check module 250 of FIG. 2 using the pre-defined thresholds 242 from the first storage unit 450, and can generate the update flag 252 of FIG. 2 if a threshold has been met or exceeded.

The second device 406 can operate the update subtotal module 260 of FIG. 2 in response to the update flag 252. The first communication unit 412 can send the first device transmission 420 with the update flag 252, the current location reading 204, the current heading 224, and the incremental mileage 222 across the communication path 404 to the second communication unit 440. The second communication unit 440 can receive the first device transmission 420.

The second control unit 442 can operate the update subtotal module 260 of FIG. 2 to add the incremental mileage 222 to the subtotal mileage 232 to update the subtotal mileage 232. The update subtotal module 260 can also store the current location reading 204 as the previous location reading 216 of the second previous samples module 472, and store the current heading 224 as the previous heading 218 of the second previous samples module 472. The update subtotal module 260 can also store the current time stamp 206 as the previous time stamp 220 of the second previous samples module 472.

For illustrative purposes, the navigation system 400 is shown with the first previous samples module 462 in the first device 402 and the second previous samples module 472 in the second device 406, although it is understood that the navigation system 400 can include a different partition for the previous samples. For example, the navigation system 400 can have the first previous samples module 462 or the second previous samples module 472 as optional.

The subtotal mileage 232 can be stored on the second storage unit 452. The second device 406 can provide additional storage capacity to the first storage unit 450. Also, the second device 406 can have additional central processing unit (CPU) power, or more sophisticated software to operate on the subtotal mileage 232. For example, the second device 406 can operate statistical analysis on the subtotal mileage 232, or identify when the first device 402 is facing heavy traffic, or monitor the efficiency of a device with the navigation system 200.

Also for illustrative purposes, the navigation system 400 is shown with the modules of the navigation system 200 of FIG. 2 operated by the first device 402 and the second device 406. It is to be understood that the first device 402 and the second device 406 can operate any of the modules and functions of the navigation system 200 of FIG. 2.

For example, the first device 402 is shown to operate the incremental calculation module 212 and the total mileage module 230, although it is understood that the second device 406 can also operate the incremental calculation module 212 and the total mileage module 230. As a further example, the second module is shown to operate the update subtotal module 260, although it is understood that the first device 402 can also operate the update subtotal module 260.

Figure 5:
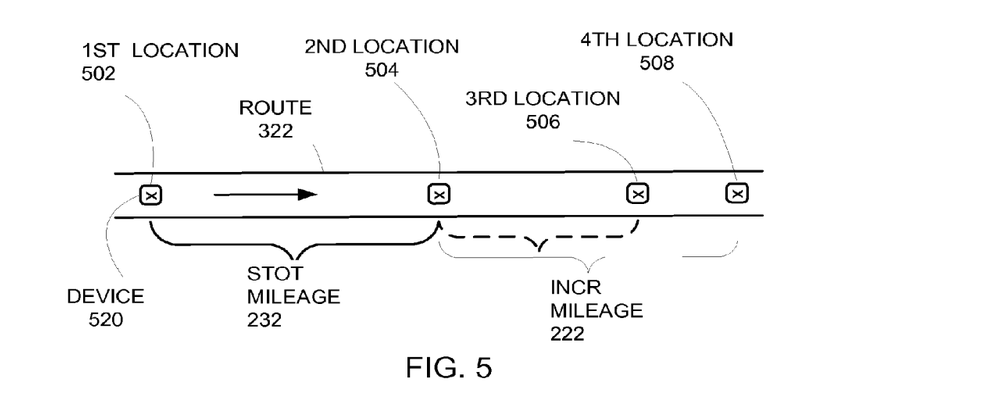
FIG. 5 is a geographic view of a first example application of the navigation system of FIG. 2.

Referring now to FIG. 5, therein is shown a geographic view of a first example application of the navigation system 200 of FIG. 2. FIG. 5 shows a street diagram, and a device 520 having the navigation system 200. The geographic view depicts the device 520 traversing a street as part of the route 322 of FIG. 3. The direction of the route 322 is depicted by the arrow as an example. The route 322 can be generated by other functions of the navigation system 200 or another device. The route 322 can be stored in the storage unit 350 of FIG. 3. For illustrative purposes, the route 322 is shown as a linear or straight street segment, although it is understood that the navigation system 200 can operate with the route 322 having multiple curved portions or having multiple speed zones.

The subtotal mileage 232 of FIG. 2 can be a measurement of a distance between two locations sampled by the navigation system 200. For example, the subtotal mileage 232 can be the distance from a first location 502 to a second location 504 along the route 322. The subtotal mileage 232 can be stored in the storage unit 350. The first location 502 can represent a starting location of the navigation system 200 on the route 322. The second location 504 can be the previous location reading 216 of FIG. 2 in the previous samples module 214 of FIG. 3.

The device 520 can traverse the route 322 and the navigation system 200 can operate the location reading module 202 of FIG. 2. The navigation system 200 can receive the current location reading 204 of FIG. 2 when the device 520 is at a third location 506.

The incremental calculation module 212 of FIG. 2 can calculate the incremental mileage 222 of FIG. 2, which is the distance from the second location 504 as the previous location reading 216 to the third location 506 as the current location reading 204. The incremental mileage 222 at the third location 506 is depicted by a dotted line in FIG. 5. The total mileage module 230 of FIG. 2 can use the subtotal mileage 232 and the incremental mileage 222 to calculate the total mileage 234 of FIG. 2 traversed by the device 520 from the first location 502 to the third location 506.

The navigation system 200 can also operate the subtotal check module 250 of FIG. 2. The subtotal check module 250 can determine whether to operate the update subtotal module 260 of FIG. 2. For the purpose of this illustration, the subtotal check module 250 determines not to operate the update subtotal module of FIG. 2. The navigation system 200 can return to the location reading module 202.

The device 520 can continue to traverse the route 322, and the navigation system 200 can again receive a revised valued of the current location reading 204 at a fourth location 508. The navigation system 200 can again operate the incremental calculation module 212 to calculate a revised value of the incremental mileage 222, which is the distance from the second location 504 to the fourth location 508 as the current location reading 204. For each revised valued of the current location reading 204, the navigation system 200 can operate the incremental calculation module 212.

Figure 6:
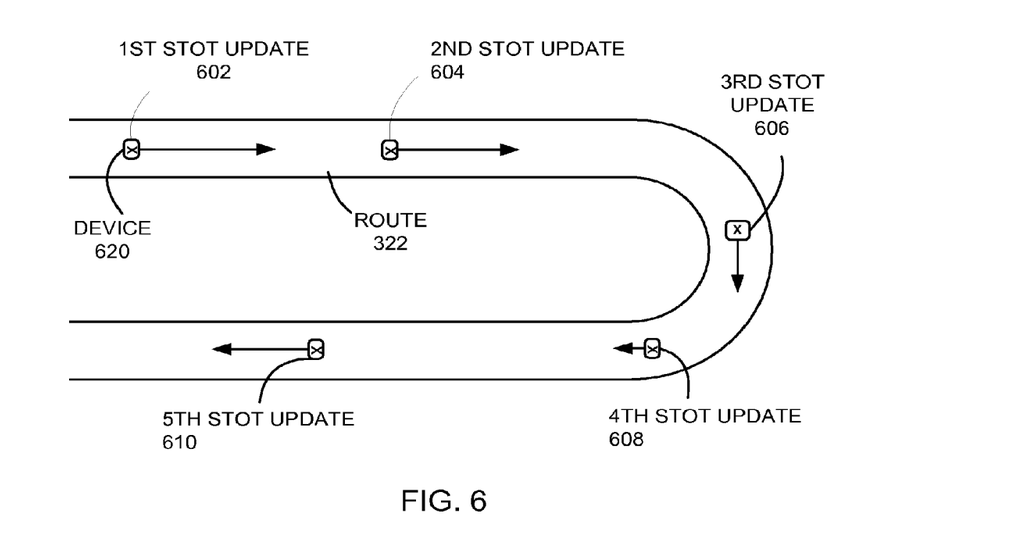
FIG. 6 is a geographic view of a second example application of the navigation system of FIG. 2.

Referring now to FIG. 6, therein is shown a geographic view of a second example application of the navigation system 200 of FIG. 2. FIG. 6 shows a street diagram, and a device 620 having the navigation system 200. The geographic view depicts the device 620 traversing a street as part of the route 322. The direction of the route 322 is depicted by the arrow, as an example. The route 322 can be generated by other functions of the navigation system 200 or another device. The route 322 can be stored in the storage unit 350 of FIG. 3.

For illustrative purposes, the route 322 is shown as having linear or straight sections with a curved section, although it is understood that the navigation system 200 can operate with the route 322 with a different configuration. For example, the navigation system 200 can operate with the route 322 having multiple curved portions, multiple straight portions or having multiple speed zones.

The device 620 can traverse the route 322, and the navigation system 200 can operate the location reading module 202 of FIG. 2 and can receive the current location reading 204 of FIG. 2 and the current time stamp 206 of FIG. 2. The navigation system 200 can calculate the incremental mileage 222 of FIG. 2 by operating the incremental calculation module 212 of FIG. 2 for each of the current location reading 204 of FIG. 2. The incremental calculation module 212 can also generate the current heading 224 of FIG. 2.

For each location reading, the navigation system 200 can operate the subtotal check module 250 of FIG. 2. The subtotal check module 250 can receive the incremental mileage 222, and compare it with the mileage threshold 244 of FIG. 2. If the incremental mileage 222 meets or exceeds the mileage threshold 244, the navigation system 200 can operate the update subtotal module 260 of FIG. 2.

The subtotal check module 250 can also receive the current time stamp 206. The subtotal check module 250 can compare the current time stamp 206 with the previous time stamp 220 of FIG. 2. If the time from the previous time stamp 220 to the current time stamp 206 exceeds the time threshold 246 of FIG. 2, the navigation system 200 can operate the update subtotal module 260.

The subtotal check module 250 can also receive the current heading 224 associated with the current location reading 204, and compare the current heading 224 with the previous heading 218 of FIG. 2. If the current heading 224 is different from the previous heading 218 by more than the heading threshold 248 of FIG. 2, the navigation system 200 can operate the update subtotal module 260.

The device 620 can traverse the route 322, and the navigation system 200 can operate the location reading module 202 of FIG. 2 to generate the current location reading 204 at a first subtotal update location 602. If the subtotal check module 250 determines that one or more of the pre-defined thresholds 242 of FIG. 2 has been met or exceeded, the subtotal check module 250 can set the update flag 252 of FIG. 2.

The update subtotal module 260 can receive the update flag 252, and can update the subtotal mileage 232 with the total mileage 234 of FIG. 2. The update subtotal module 260 can also update the previous location reading 216 of FIG. 2 with the current location reading 204. The subtotal update can also update the previous heading 218 of FIG. 2 with the current heading 224, and can update the previous time stamp 220 of FIG. 2 with the current time stamp 206. The previous location reading 216, the previous time stamp 220 and the previous heading 218 can be stored in the previous samples module 214 of FIG. 2.

The device 620 can continue to traverse the route 322 beyond the first subtotal update location 602, and the navigation system 200 can operate the functions of the system to calculate and display the total mileage 234. The navigation system 200 can operate the location reading module 202 to revise the current location reading 204 at a second subtotal update location 604.

The subtotal check module 250 can determine whether one or more of the predefined thresholds 242 has been met or exceeded. For example, the subtotal check module 250 can determine whether the incremental mileage 222 meets or exceeds the mileage threshold 244. The subtotal check module 250 can set the update flag 252, and the navigation system 200 can operate the update subtotal module 260.

The device 620 can continue to traverse the route 322 beyond the second subtotal update location 604 and the navigation system 200 can calculate and display the total mileage 234. The navigation system 200 can operate the location reading module 202 to revise the current location reading 204 at a third subtotal update location 606.

For illustrative purposes, the third subtotal update location 606 is shown with a different heading from the second subtotal update location 604, depicted by the arrow. The subtotal check module 250 can determine whether a threshold has been exceeded. The current heading 224 at the third subtotal update location 606 differs from the previous heading 218 at the second subtotal update location 604 by more than the heading threshold 248 of FIG. 2. The subtotal check module 250 can set the update flag 252 and the system can operate the update subtotal module 260.

The device 620 can continue to traverse the route 322 beyond the third subtotal update location 606, and the navigation system 200 can calculate and display the total mileage 234. The navigation system 200 can operate the location reading module 202 to revise the current location reading 204 at a fourth subtotal update location 608.

For illustrative purposes, the fourth subtotal update location 608 is shown with a different heading from the third subtotal update location 606. The current heading 224 at the fourth subtotal update location 608 differs from the previous heading 218 at the third subtotal update location 606 by more than the heading threshold 248. The subtotal check module 250 can set the update flag 252 and the navigation system 200 can operate the update subtotal module 260.

The device 620 can continue to traverse the route 322 beyond the fourth subtotal update location 608, and the navigation system 200 can calculate and display the total mileage 234. The navigation system 200 can operate the location reading module 202 to revise the current location reading 204 at a fifth subtotal update location 610. For illustrative purposes, the device 620 at the fifth subtotal update location 610 is shown with a similar heading as at the fourth subtotal update location 608.

The subtotal check module 250 can determine whether the time threshold 246 or the mileage threshold 244 has been met or exceeded, although for this example, the heading threshold 248 has not been exceeded. If the subtotal check module 250 determines that the mileage threshold 244 or the time threshold 246 has been met or exceeded, the subtotal check module can set the update flag 252 and the system can operate the update subtotal module 260.

Figure 7:
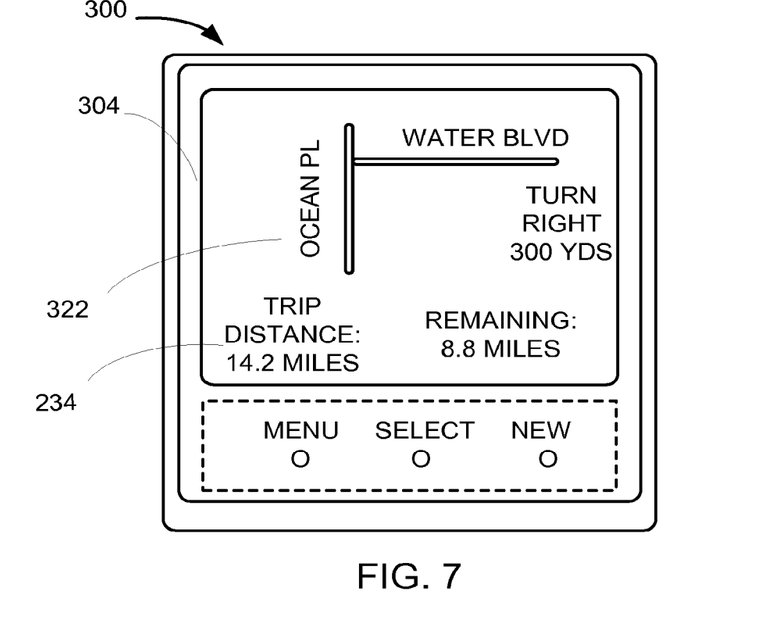
FIG. 7 is an illustration of an example of the navigation system of FIG. 3 having mileage mechanism.

Referring now to FIG. 7, therein is shown an illustration of an example of the navigation system 300 of FIG. 3 having mileage mechanism. The navigation system 300 is shown with the user interface 304.

The user interface 304 displays a street map on a multimedia display interface of the navigation system 300, as the navigation system 300 traverses the route 322 of FIG. 2. The display shows a street map with turn guidance. In this example, turn guidance includes an instruction to make a turn after a given distance. The example also shows the names of the streets on the route 322.

Also shown is the display of the total mileage 234 of FIG. 2, which is the total distance traversed by the navigation system 300 since the starting point of the route 322. The total distance is expressed in miles, although it is to be understood that a different scale can be used. For example, the distance can be expressed in kilometers.

The display of the user interface 304 can also show the distance remaining on the route 322. The navigation system 300 can have means for generating navigation routing information to a target location, such as the route 322 of FIG. 3. The navigation information can include the calculated length of the route 322 and turn guidance along the route 322.

The navigation system 300 can make an unscheduled turn off the route 322, and the navigation system 300 can recalculate a new route to a target location to compensate for the unscheduled turn. An unscheduled turn off the route 322 can include making an incorrect turn, making an unplanned detour, such as a U-turn, or making a stop at an unplanned point of interest.

The navigation system 300 can calculate the mileage traversed including the unscheduled turn, and can calculate and display the remaining distance on a recalculated route. The navigation system 300 can display the distance traveled including the unscheduled turn, as well as the distance remaining to a target location.

Figure 8:
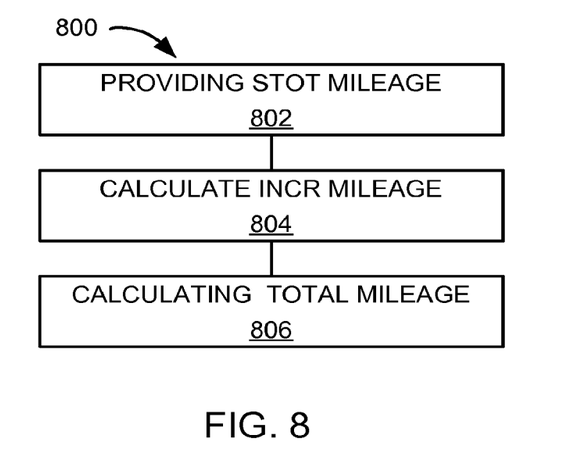
FIG. 8 is a flow chart of a method of operation of a navigation system having mileage mechanism in a further embodiment of the present invention.

Referring now to FIG. 8, therein is shown a flow chart of a method 800 of operation of a navigation system 200 having mileage mechanism in a further embodiment of the present invention. The method 800 includes providing a subtotal mileage for a previous location reading along a route in a module 802; calculating an incremental mileage at a current location reading from the previous location reading in a module 804; and calculating a total mileage based on the subtotal mileage and the incremental mileage for displaying on a device in a module 806.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of a device, comprising:
   determining, by a processor, a previous location reading associated with a route and a previous heading associated with the previous location reading;
   determining, by the processor, a subtotal mileage associated with the previous location reading;
   receiving, by the processor, a current location reading associated with the route and a current heading associated with the current location reading;
   calculating, by the processor, an incremental mileage based on the current location reading and the previous location reading;

calculating, by the processor, a total mileage based on the subtotal mileage and the incremental mileage for display at a display device;

calculating, by the processor, a change in heading between the previous heading and the current heading;

determining, by the processor, that the change in heading meets a threshold heading criteria;

responsive to determining that the change in heading meets a threshold heading criteria, updating, by the processor, the subtotal mileage with the total mileage; and updating, by the processor, the previous heading associated with the previous location reading with the current heading.

2. The method of claim 1, wherein the device is integrated with a vehicle.

3. The method of claim 1, wherein the threshold heading criteria changes based on characteristics of a geographical location.

4. The method of claim 1, further comprising: initializing the subtotal mileage to a predetermined value.

5. The method of claim 1, further comprising: generating and displaying a graphical representation of the route at an output unit coupled to the processor.

6. The method of claim 5, wherein the graphical representation of the route includes display of a street map.

7. The method of claim 1, further comprising: providing turn guidance to navigate the route.

\* \* \* \* \*